G. M. AND H. F. ST. G. CAULFEILD.
MOTOR VEHICLE.
APPLICATION FILED AUG. 28, 1917.

1,353,379.

Patented Sept. 21, 1920.

UNITED STATES PATENT OFFICE.

GERALDINE MARGUERITE CAULFEILD AND HARRY FROWD ST. GEORGE CAULFEILD, OF LEE-ON-THE-SOLENT, ENGLAND.

MOTOR-VEHICLE.

1,353,379.  Specification of Letters Patent.  Patented Sept. 21, 1920.

Application filed August 28, 1917. Serial No. 188,686.

*To all whom it may concern:*

Be it known that we, GERALDINE MARGUERITE CAULFEILD and HARRY FROWD ST. GEORGE CAULFEILD, both subjects of the King of Great Britain and Ireland, residing at Lee-on-the-Solent, in the county of Hampshire, England, have invented certain new and useful Improvements in or Relating to Motor-Vehicles; and we do hereby declare the following to be a full, clear, and exact description of the invention, such as will enable others skilled in the art to which it appertains to make and use the same.

This invention relates to motor vehicles provided with pedal operating devices for controlling a clutch mechanism or for controlling the brake mechanism.

It is found in practice that considerable drawbacks exist with the ordinary types of motor vehicles, because the pedal controlled mechanisms for operating the clutching gear and the brakes are inconvenient or unsuitable for wounded or maimed persons or for others who are not able to use their feet in the ordinary way.

Our present invention refers to means, by the use of which, a person who is unable to use one or both of his or her feet, can control the clutch operating and brake operating pedals or their equivalents in a manner quite as efficient as that in which a person in full use of his or her feet can control them.

According to the general principle of our invention we provide instead of, or preferably in addition to the ordinary pedals, for controlling the clutching and declutching or brake mechanism, means in easy reach of the hand or hands for controlling such mechanisms, so that a person who is unable for some reason to use his or her feet for controlling the pedals, may nevertheless be able to control completely the clutching and declutching mechanisms or the brake mechanisms of the car.

For this purpose we connect to or combine with the pedal a device or transmission mechanism, which enables the pedal to be brought into the correct position for controlling the clutching and unclutching mechanism or the brake mechanism of the motor vehicle, and we associate therewith means for locking the parts in any desired position, such means being adapted to be easily and quickly released, according to requirements.

In one typical method of carrying out our invention as applied to the control of the clutching and unclutching or brake mechanism of a motor vehicle, we provide in some suitable position, at the front of the vehicle, for instance, in connection with the dash board, a bracket carrying a pulley. The bracket and pulley are so located that a wire passing around the said pulley and attached to the ordinary pedal may operate the same in a manner analogous to the operation thereof by the foot.

The wire passes to a lever arm or the like, which is pivoted to a suitable fitting in connection with the steering pillar. This lever arm is provided with a pawl adapted to engage a suitable rack, toothed quadrant or sector, so that the lever and wire may be locked in any desired position. Means are provided for disengaging the pawl when necessary.

With this arrangement, it is simply necessary to pull upon the lever arm, the pull being transmitted by means of the wire to the pedal, which is thus brought into the requisite position and held in that position by means of the pawl. When it is desired to alter the position of, or to release the pedal, it is simply necessary to disengage the pawl when the lever arm can be brought into a new position or allowed to return to its inoperative position. Each of the lever arms or both of the lever arms are located within easy reach of the hand so that they may be operated without interference with the manipulation of the steering wheel.

It will be understood that the device may be applied to either or both of the pedals for controlling the clutch and brake mechanisms, and where the device is applied to both the clutching and brake mechanisms, we prefer to locate one of the controlling levers on each side of the steering pillar.

And in order that our said invention may be more clearly understood, we will now proceed to describe the same with reference to the drawing accompanying this specification, which illustrates one method of applying our invention to the clutch operating and brake operating mechanism of a motor car.

The same numerals of reference are employed to denote the same parts in all the views.

Figure 1:
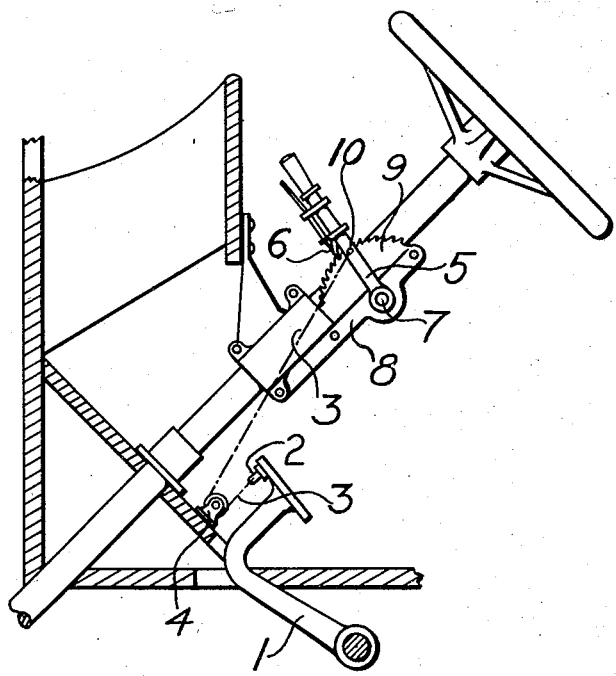
Figure 1 shows a fragmentary side view, partly in section of a portion of the dash board of a motor car with our invention adapted thereto.
Figure 2:
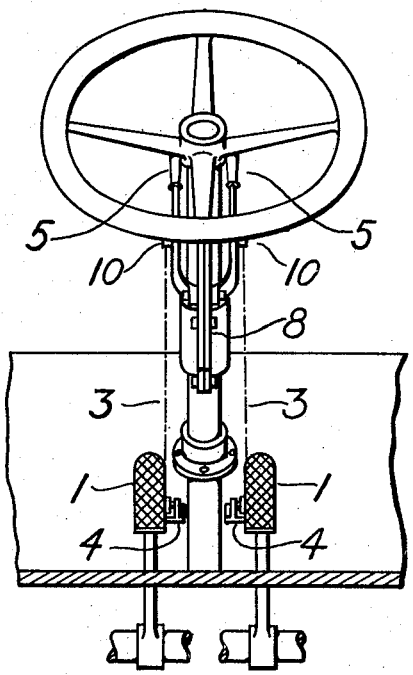
Fig. 2 shows front elevation of same and Fig. 3 shows plan of same.
Figure 3:
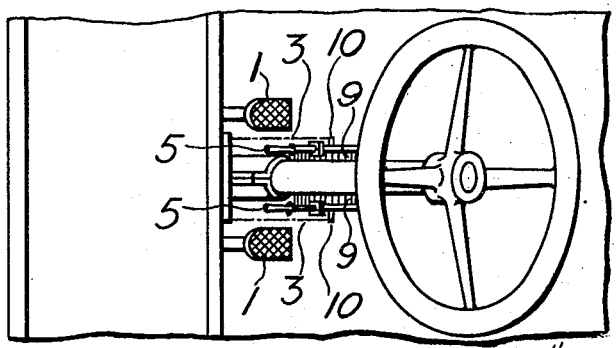

Each of the pedals 1 has connected to the back thereof at 2 a wire, cable chain or the like 3, which passes around a pulley 4 carried in or by a bracket as shown. 5 are levers with pawls 6. These levers are pivoted at 7 to a fitting 8, clamped around the steering column.

The fitting 8 is formed with or has attached thereto, on each side of the steering column toothed quadrants 9 for the pawls 6 on the levers to engage. The other ends of the wires or the like 3 are attached at 10 to levers 5.

The operation will be readily understood. When it is not desired, or it is not possible to operate the clutch or brake pedal by means of the foot, it can be operated by hand from the steering column. For this purpose in order to depress the pedals, it is simply necessary to pull upon the lever 5, the result being that the pull being transmitted by the wire or cable 3, around the pulley 4, pulls down the lever 1 and the mechanism is locked in the new position by the pawl 6. When it is desired to allow the pedal to return to its normal position it is simply necessary to release the pawl 6 from the ratchet 9 and to allow the parts to return to the original or to the required position.

Any other transmission mechanism, instead of a wire passing over a pulley may be adopted, such for instance as a Bowden wire, a system of compound levers or the like, and any locking means may be employed the principle of the invention being to provide means of a supplementary character, for enabling a person who cannot, or does not wish to use his or her feet for the operation of the pedal levers to be able to control a motor vehicle with the same facility as a driver can control the same who has the full use of his or her feet.

What we claim and desire to secure by Letters Patent in the United States of America is:—

1. A motor vehicle of the type described, including means for controlling the clutch or brake mechanism, manually actuated means pivotally supported upon the steering post, flexible means of connection between said manually actuated pivoted means and said mechanism controlling means, and ratchet and detent retaining means.

2. A motor vehicle, including a pedal for controlling the clutch or brake mechanism, a manually actuated and pawl-equipped lever pivotally positioned upon the steering post, flexible means of connection between said pedal and lever, said connecting means being attached to said pedal at its heel-end and passed in contact with a rotary member intermediate of said lever and rotary member and a ratchet positioned upon said steering post and so as to be engaged by the pawl of said lever.

3. An attachment for automobiles, comprising in combination with the brake and clutch control pedals, a plurality of pivotally mounted levers and means for operatively connecting the levers with the pedals.

4. A control attachment for automobiles comprising the combination with the brake and clutch control pedals, of hand actuated controlling elements, and means connecting the hand actuated elements with said pedals for the purpose of imparting movement to said pedals.

5. The combination with an automobile including foot actuated brake and clutch control pedals, of hand control means having operative connection with the pedals for imparting movement thereto.

6. The combination with an automobile including foot actuated control pedals, of hand control means having operative connection with the pedals for imparting movement thereto.

In testimony whereof, we affix our signatures.

GERALDINE MARGUERITE CAULFEILD.
HARRY FROWD ST. GEORGE CAULFEILD.

Witnesses:
HARVEY J. BAVERSTOCK,
JOHN A. BROOMHEAD.